United States Patent [19]

Reed

[11] Patent Number: 4,475,969

[45] Date of Patent: Oct. 9, 1984

[54] LABEL ROLL MANUFACTURE

[75] Inventor: Charles F. Reed, Painesville, Ohio

[73] Assignee: Avery International Corporation, Pasadena, Calif.

[21] Appl. No.: 162,725

[22] Filed: Jun. 25, 1980

Related U.S. Application Data

[63] Continuation of Ser. No. 870,837, Jan. 19, 1978, abandoned.

[51] Int. Cl.³ .............................................. B32H 3/16

[52] U.S. Cl. .................................... 156/152; 156/215; 156/249; 156/257; 156/265; 156/267; 156/268; 156/344

[58] Field of Search ........................ 156/152, 247-249, 156/267, 268, 344, 257, 264-265; 428/40-42; 40/2 R

[56] References Cited

U.S. PATENT DOCUMENTS

| | | | |
|---|---|---|---|
| 231,001 | 8/1980 | Bradley | 144/309 B |
| 1,762,539 | 6/1930 | Adams | 156/264 |
| 2,303,346 | 12/1942 | Flood | 156/152 X |
| 2,304,787 | 12/1942 | Avery | 156/248 X |
| 2,601,005 | 6/1952 | Raney | 156/264 |
| 3,457,137 | 7/1969 | McCarthy | 156/152 |
| 3,694,287 | 9/1972 | Marshall | 156/152 |
| 3,751,320 | 8/1973 | Buck | 156/268 |
| 3,825,463 | 7/1974 | Amann | 156/268 X |
| 3,892,901 | 7/1975 | Smith | 428/41 |
| 4,124,429 | 11/1978 | Crankshaw | 156/584 X |

*Primary Examiner*—David A. Simmons
*Attorney, Agent, or Firm*—Pearne, Gordon, Sessions, McCoy, Granger & Tilberry

[57] ABSTRACT

Paper label stock combined with liner material is butt cut to provide labels surrounded by a "rungless" ladder-shaped matrix whose side rails have relatively straight borders and can be relatively easily stripped. The labels, as formed, are adjacent each other, but are repositioned and spaced by off-feeding the labels from their original combination with liner material, and redepositing them on liner material moving in a path at 90 degrees to the direction of off-feed. When the labels are subsequently applied to a cylindrical container or the like, the grain of the labels is parallel to the axis of the container. In a label roll so manufactured, the grain of the labels runs crosswise.

3 Claims, 6 Drawing Figures

LABEL ROLL MANUFACTURE

This is a continuation of application Ser. No. 870,837 filed Jan. 19, 1978, now abandoned.

It has long been a practice in the label industry to provide rolls of paper labels in the form of a web of liner material and a succession of spaced labels temporarily adhered thereto on a face thereof, such construction being wound on itself to provide a roll of labels which may be conveniently dispensed. The construction is formed by die-cutting the labels in a layer of adhesive paper label stock, and then stripping or separating the matrix of waste or excess label material, leaving the die-cut labels adhered to the liner. The labels must be adhesive throughout their areas, so all cuts in the adhesive label stock are through adhesive areas thereof. Such construction can then be wound into label rolls which are subsequently unrolled to feed labels for application to workpieces such as bottles or cans having walls of cylindrical shape, or having walls of another more complex shape of simple curvature as distinguished from a shape of compound curvature.

Since the grain of the paper label stock runs in the machine direction, the grain of the labels does also. The result is that when the labels are dispensed in the proper direction for application and wrapping on the workpieces, the grain of each label is not parallel to the central axis of its associated workpiece, but must extend partially around the workpiece. It is therefore relatively difficult to properly wrap labels on workpieces of high curvature (small radius) because of the difficulty of bending the grain around the high curvature.

The present invention provides for improved wrapping action by orienting the label grain so that the grain of each label can be parallel to the axis of its associated workpiece at the dispensing station, thereby allowing the application and wrapping of a given paper label stock to workpieces of smaller radius than would otherwise be possible, or allowing workpieces of a given radius to be wrapped by labels made of paper stock which is less fragile, and therefore less flexible, than would otherwise be possible.

In the initial stages of the manufacturing sequence described above, the label stock must be sufficiently strong to allow the matrix of excess or waste label material to be stripped. Proper stripping becomes more difficult to achieve as line speeds are increased or as lighter or more fragile material is sought to be used in order to improve labelling performance or reduce costs or allow processing of delicate label stock.

The present invention reduces this limitation by reducing resistance to stripping. The matrix is formed as a "rungless" ladder whose side rails have relatively straight borders with low stripping resistance. Accordingly, stock of greater fragility can be employed at a given line speed, thereby contributing to label flexibility or cost reduction or to the successful processing of delicate label stock or to the degree of curvature which can be tolerated.

The objects and advantages of the invention will be more fully understood from the following description and the accompanying drawings.

Figure 1:
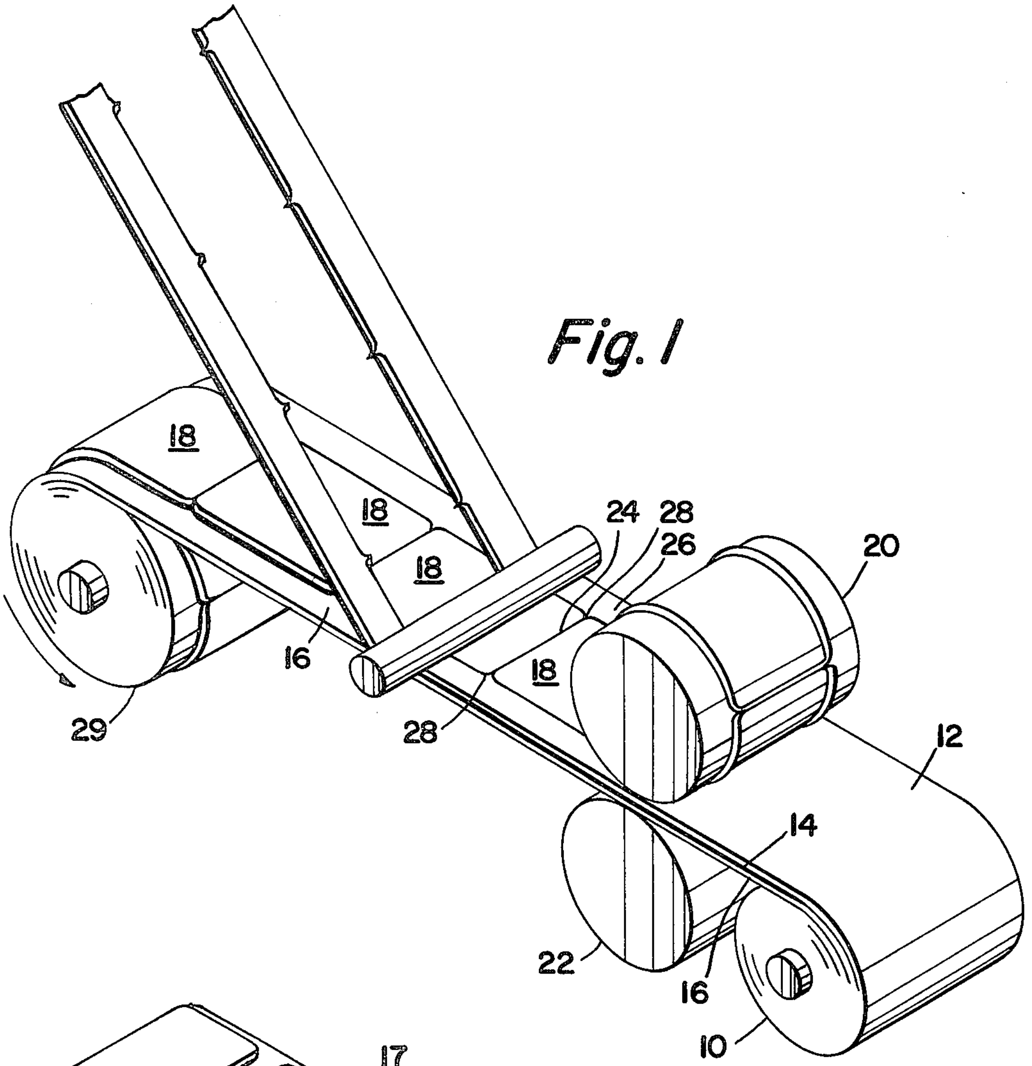
FIG. 1 is a schematic isometric view illustrating an example of label forming and matrix stripping according to the invention.

In FIG. 1, the supply roll 10 comprises a long strip of paper label stock 12 having adhesive 14 on its underside. Because of the constraints of paper manufacture, the grain of the label stock 12 runs in the machine direction, that is, lengthwise of the strip. The stock of the roll 10 has been combined with a strip of liner material 16 which is adapted to be temporarily and releasably adhered to by the adhesive 14, as by means of a release coat (not shown) on top of the liner material. Label stock of such general construction has been long known and is widely used in the packaging and labelling industry. As is well known, the label stock can be formed into a series of separate labels by die-cutting, and the scrap areas of the label stock may then be stripped, leaving the series of separate labels temporarily adhered to the liner material. The liner material supports the separate labels during printing or decorating, or other processing, and during storage, and provides a means to feed and dispense the labels in a controlled manner.

According to one aspect of the invention, separate labels 18 are first butt cut in the label stock, as by coaction of the die roll 20 and anvil roll 22. The die of die roll 20 cuts through the label stock 12 and into or through the layer of adhesive 14, but does not sever the liner material 16. Since the adhesive 14 runs from side edge to side edge of the construction as supplied from the supply roll 10, all cuts are clearly in adhesive areas in the illustrated embodiment, thereby assuring that the labels 18 are adhesive throughout their areas. This will be true so long as all the cuts are in adhesive areas even if adhesive is not provided all the way to the edges of the strip of label stock.

The butt cutting operation shown in FIG. 1 divides the label stock into (1) an all-adhesive label area made up of the series of adjacent labels 18 which are divided from each other by the transverse cuts 24, and (2) side rail areas 26 which run continuously along the sides of the strip. There are no transverse cuts in the label stock at the side rail areas 26.

The borders between each side rail area 26 and the label area extend generally lengthwise of the strip without any deep lateral indentations. The side rail areas may have some slight indentations, such as the small notches 28, which are the result of forming the labels 18 with slightly rounded corners.

After the side rail areas are formed, they are stripped as shown in FIG. 1. In the course of stripping, the adhesive label stock 12 at the side rail areas separates and lifts from the adhesive label stock in the label area along lengthwise paths which correspond to the deep-indentation-free borders between the side rail areas and the label area. Consequently, the matrix of scrap formed by the two side rail areas strips with relative ease. This matrix is similar in shape to a "rungless" ladder, i.e., a ladder from which all rungs have been omitted, leaving only the two unconnected side rails of the ladder.

After stripping, the construction is wound into a roll 29 which is subsequently unwound to act as a supply roll for the operation shown in FIG. 2. Alternatively, the roll 29 may be omitted and the product resulting from the cutting and stripping operations illustrated in FIG. 1 may be fed directly to the reorienting station 30 shown in FIG. 2.

Figure 2:
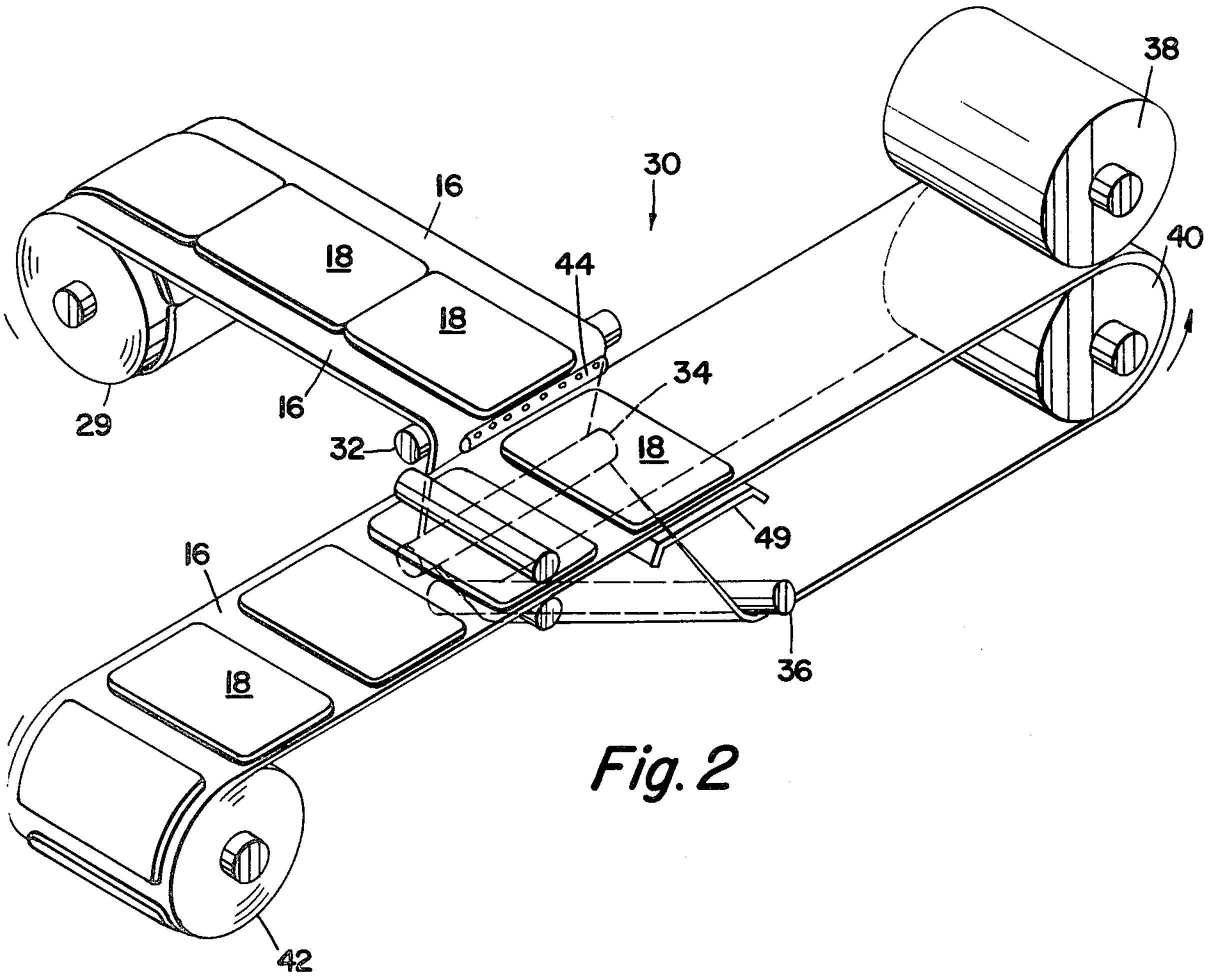
FIG. 2 is a schematic isometric view of label repositioning according to the invention.

In FIG. 2, the liner material 16 is trained over a peel member 32 and then around guide members, such as the rolls or guide bars 34 and 36 and the bottom member 40 of the pair of rolls 38 and 40. Rolls such as 38 and 40 can be powered to thereby supplement the pulling power of a take-up roll 42. From the roll 40 to the take-up roll, the construction moves at 90 degrees to the direction from which the construction approaches the peel member 32. These two paths of movement are joined by a transition path between the peel member 32 and the roll 40. The labels separate from the liner at the peel member 32, but are immediately redeposited on liner material. Air jets from a distributor or manifold 44 may be employed to support and guide the labels during redepositing. As redeposited, the labels are oriented with the grain of the paper running across the strip, or parallel to the axis of the take-up roll 42. Rolls 46 and 48 may be provided to aid in pressing the redeposited labels into sufficiently firm association with the liner material to assure integrity of the construction when it is wound into the roll 42. A support plate 49 may be provided to support the liner material at the reorientation station 30 so that a hammer, roll, additional air blast, or the like (not shown) may be applied downwardly on each label 18 as it is repositioned on the liner 46 in order to further guide the repositioning or fix the label more firmly in its new position. As originally formed, the labels in FIG. 2 have greater length along the liner material than their width, but as redeposited they have greater width than length, so that the labels which were originally directly adjacent each other become spaced.

Figure 3:
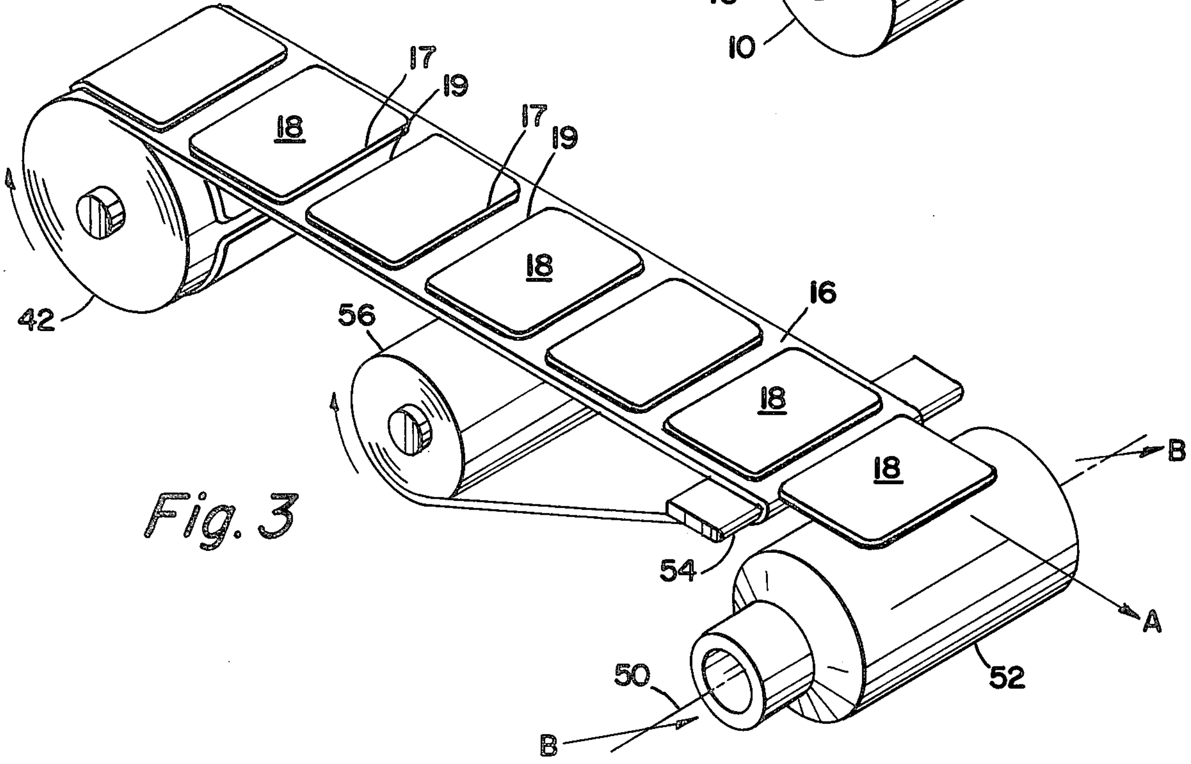
FIG. 3 is a schematic isometric view of the manufacturing use of the label roll produced according to the procedure illustrated in FIGS. 1 and 2.

FIG. 3 illustrates a label dispensing operation supplied by the roll 42 or supplied by direct line feed from the reorientation station 30 of FIG. 2. The grain of the labels 18 in FIG. 3 runs crosswise with respect to the strip of liner material and is parallel to the axis of the roll 42 if one is employed.

Although the container 52 is cylindrical, paper labels are commonly used for containers having other shapes of simple curvature, as distinguished from compound curvature, as for example bottles with elliptical or oval cross-section but with vertical walls. Such shapes may have a pluralty, or even an infinity, of parallel axes of curvature instead of the single axis 50 of container 52. In general, for proper label application, the direction of feed at the point of label feed-off, indicated as direction A in FIG. 3, is perpendicular to projections of the axis 50 of the container 52, or to the axes of curvature of the walls of containers of more complex shapes of simple curvature. In the practice of the present method, the grain of the labels 18 is perpendicular to the direction A at the point of feed-off. Accordingly, the grain is parallel to the central axis of the illustrated container 52, or to the axes of curvature of simply wound container walls having more complex shapes. Therefore, the labels, when applied, flex with relative ease to accommodate the curvature of the containers.

In FIG. 3, the liner material is drawn over a peel edge 54 and into a scrap roll 56. The labels peel off at the peel edge 54 to be presented to passing containers moving generally in the direction of arrows B—B. The containers may be rotated or fixed against rotation as the labels are applied, depending on the particular label application set-up.

Figure 4:
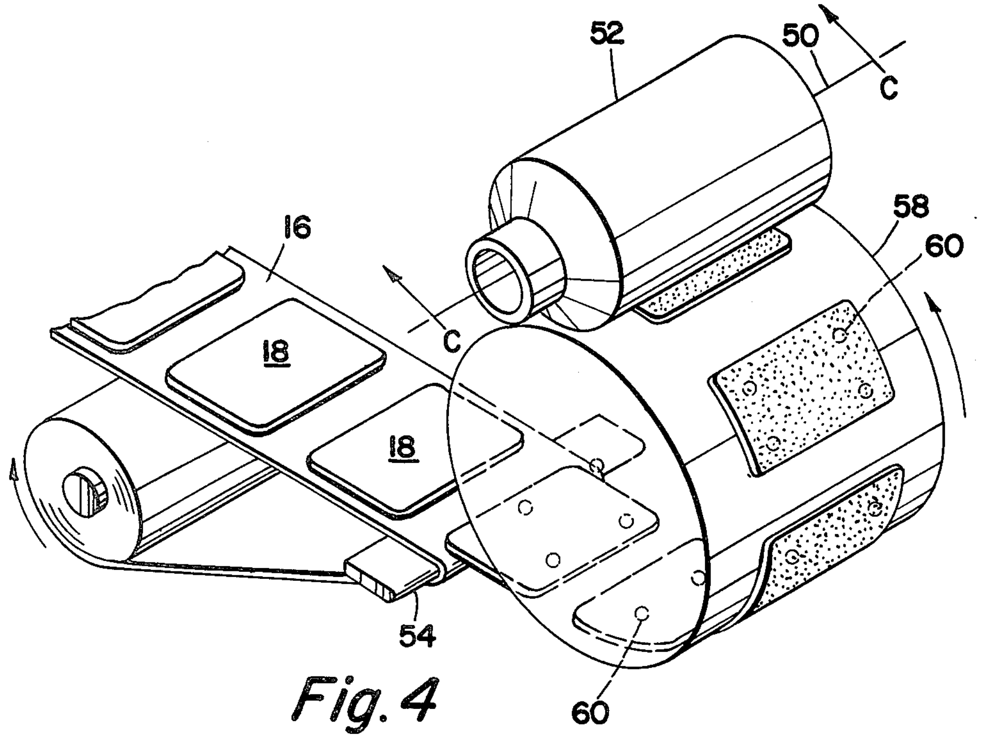
FIG. 4 is a view similar to FIG. 3 showing an alternative manufacturing use.

FIG. 4 illustrates that feed-off to the point of application may be via intermediate label handling means, such as a vacuum wheel 58 having vacuum orifices 60 for gripping labels as they separate from the liner material 16 at the peel edge 54. The wheel 58 brings the labels into rolling contact with passing containers, such as the container 52, which may for example be conveyed past the wheel 58 generally in the direction C—C. The labels are thereby rolled onto passing containers. Again, at the point of feed-off, the grain of the labels is perpendicular to projections of the axes of curvature of the containers being labelled, such as axis 50 of container 52 in FIG. 4.

Figure 5:
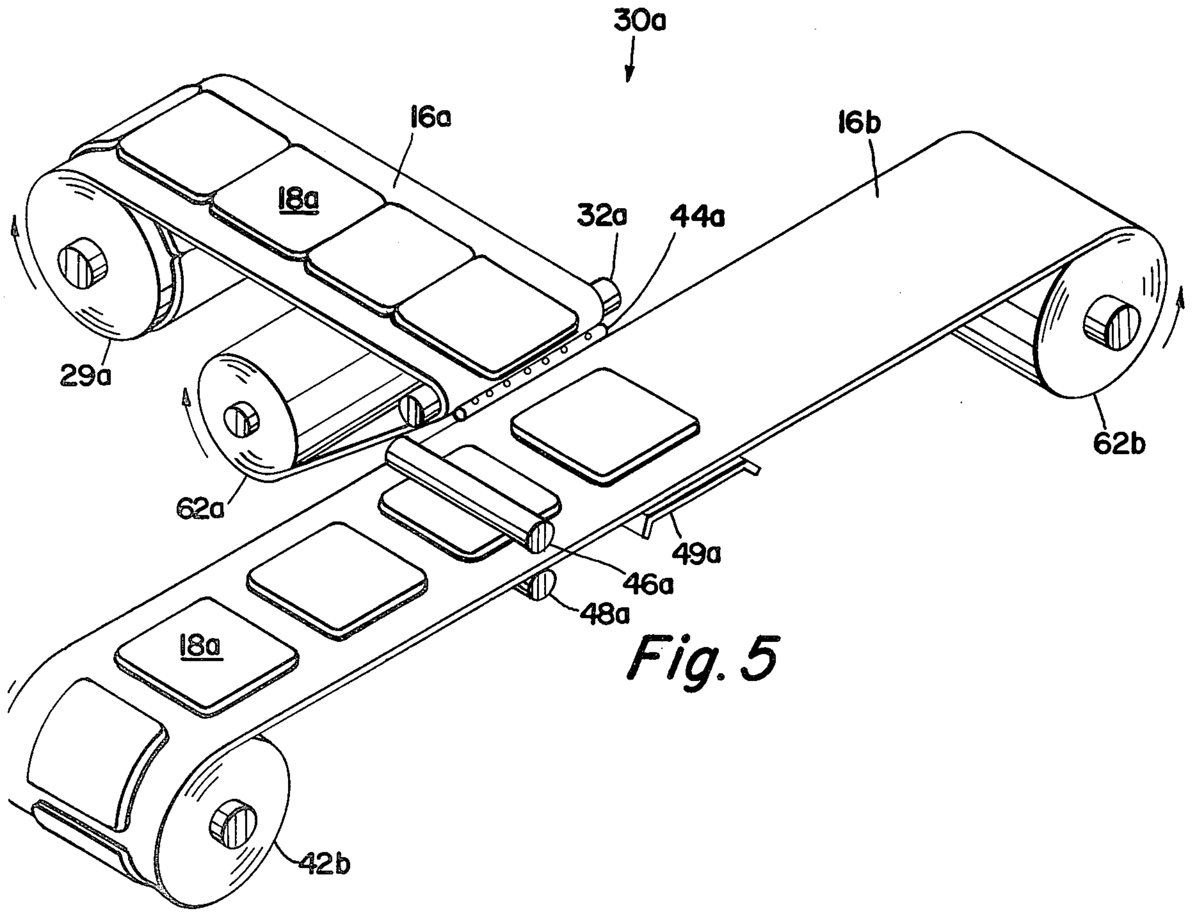
FIG. 5 is a view similar to FIG. 2 showing another repositioning procedure.

FIG. 5 shows apparatus somewhat similar to FIG. 2, except that the liner material *16a* is rewound into a roll *62a* after passing the peel member *32a*, and the reorientation station *30a* is supplied with additional liner material *16b* provided by a previously wound roll *62b*. The feed of liner material *16b* is faster than that of liner material *16a*. Therefore, even if the labels *18a* are of equal length and width, as shown, they are spaced at the reorientation station.

It should be clear from the foregoing descriptions that the rolls 42 of FIGS. 2 and 3 and the roll *42b* of FIG. 5 each comprise a strip of liner material convolutely wound around the axis of the roll and a convolute series of paper labels releasably adhered to the liner material with the paper grain of the labels being parallel to the axis of the roll. Since the inner sides of the rails 26 in FIG. 1 are relatively straight, the leading edges 17 (FIG. 3) and trailing edges 19 of successive labels in the series are generarlly parallel with each other throughout their extents. Since the liner material 16 moves at a uniform speed throughout its length in FIG. 2, the roll 42 consists of labels which are spaced apart a distance equal to the excess of their width over their length. The same is not true of the roll *42b* of FIG. 5.

Figure 6:
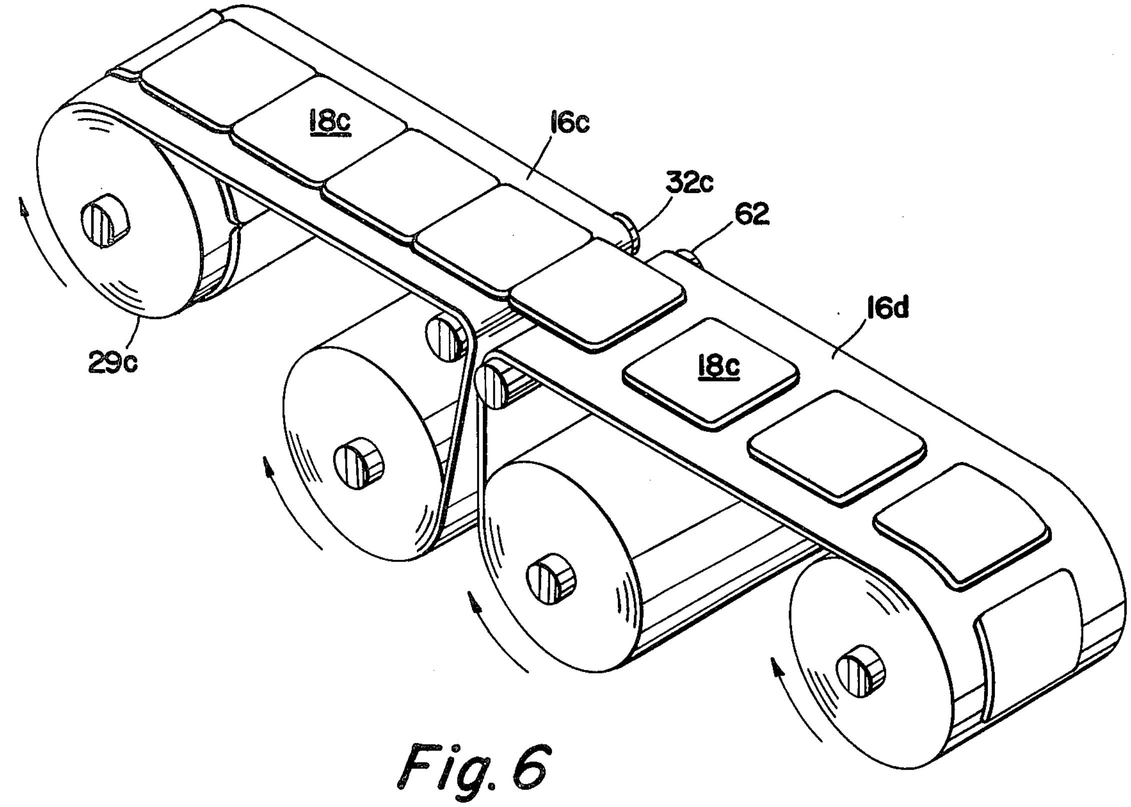
FIG. 6 is a view illustrating a label repositioning step in which there is no change in relative orientation between labels and liner material.

FIG. 6 illustrates that in one aspect of the invention the improved stripping operation shown in FIG. 1 need not be followed by label reorientation. Thus, a roll *29c* of butt-cut labels *18c* is produced by the die-cutting and stripping operation shown in FIG. 1, thereby achieving stripping with relative ease. Instead of being reoriented, the labels *18c* are simply fed over a stepped gap defined by the peel member *32c* and a guide member 62 for additional liner material *16d*. The liner material *16d* is fed at slightly greater speed than the liner material *16c* to accomplish label spacing. Such spacing operation is not novel, and no claim is made to it. The point is to illustrate that in some important aspects, the invention does not necessarily involve reorientation of label grain.

The invention is not limited to the precise details shown, but covers variants based on the invention. For example, supplemental drive rolls 38 and 40 in FIG. 2 may be omitted, or additional drive rolls may be provided, or the drive rolls may be modified. Many other changes are possible. The invention is defined by the following claims.

What is claimed is:

1. In a method for labelling surfaces of simple curvature, such as cylindrical container walls, using a laminate comprising a long strip of paper label stock combined with liner material with the grain of the label stock running along the liner material, and wherein the label stock is cut to form labels supported on the liner material and excess label stock is stripped, and wherein the labels are subsequently liner-fed directly or indirectly onto said surfaces to be labelled with the direction of feed at the point of feed-off perpendicular to projections of the axis of curvature of said surfaces for proper application and proper partial wrapping of labels on said surfaces, the steps of repositioning successive labels following stripping of excess label stock, by removing successive labels from their original combination with liner material, changing the relative orientation between the labels and liner material by 90 degrees, and redepositing the labels on liner material whereby the grain of the labels runs crosswise, and then liner-feeding labels directly or indirectly to said surfaces with the paper grain of the labels perpendicular to the direction of feed at the point of feed-off and parallel to the axes of curvature of said surfaces for maximum label flexibility during application and during partial wrapping of the labels onto said surfaces.

2. A method as in claim 1, in which such change in orientation is accomplished by guiding liner material along a first path, then along a transition path, and then along a second path transverse to the first path, causing the removal of the labels from the liner material as the liner material reaches the end of the first path and redepositing the labels on passing liner material moving along the second path.

3. A method as in claim 1, in which such change in orientation is accomplished by guiding liner material on which the labels are formed along a first path, guiding additional liner material along a second path transverse to the first path, causing the removal of the labels from the liner material reaching the end of the first path and redeposit of the labels on passing liner material moving along the second path.

* * * * *